(12) United States Patent
Han et al.

(10) Patent No.: US 7,632,000 B2
(45) Date of Patent: Dec. 15, 2009

(54) BACKLIGHT ASSEMBLY AND LIQUID CRYSTAL DISPLAY DEVICE HAVING THE SAME

(75) Inventors: Byung-Woong Han, Incheon (KR); Young-Bee Chu, Suwon-si (KR); Jong-Whan Cho, Gunpo-si (KR); Dong-Cheol Kim, Suwon-si (KR); Ju-Hyoun Kim, Suwon-si (KR); Young-Hee Park, Busan (KR); Kyu-Seok Kim, Yongin-si (KR); Jong-Nam Lee, Anyang-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 146 days.

(21) Appl. No.: 11/440,612

(22) Filed: May 24, 2006

(65) Prior Publication Data

US 2006/0268579 A1   Nov. 30, 2006

(30) Foreign Application Priority Data

May 25, 2005 (KR) .................. 10-2005-0044154
Jun. 13, 2005 (KR) .................. 10-2005-0050515

(51) Int. Cl.
*A47F 3/00* (2006.01)

(52) U.S. Cl. .................. 362/561; 362/607; 362/333

(58) Field of Classification Search .................. 362/561, 362/602, 607, 606, 612, 613, 618, 627, 333
See application file for complete search history.

(56) References Cited

U.S. PATENT DOCUMENTS

| | | | |
|---|---|---|---|
| 6,327,088 B1 * | 12/2001 | Iwata et al. .................. | 359/599 |
| 6,556,347 B1 * | 4/2003 | Murayama et al. .......... | 359/453 |
| 6,579,606 B1 * | 6/2003 | Uchiya et al. ............... | 428/323 |
| 6,709,143 B2 * | 3/2004 | Harada et al. ............... | 362/558 |
| 6,906,761 B2 * | 6/2005 | Nakano ....................... | 349/65 |
| 2004/0105052 A1 * | 6/2004 | Uekita et al. ................ | 349/112 |
| 2005/0127824 A1 * | 6/2005 | Mori et al. .................. | 313/504 |
| 2005/0174508 A1 * | 8/2005 | Takahashi et al. ............ | 349/62 |
| 2005/0259438 A1 * | 11/2005 | Mizutani et al. ............ | 362/612 |
| 2006/0012989 A1 * | 1/2006 | Lee .............................. | 362/231 |

* cited by examiner

*Primary Examiner*—Sandra L O'Shea
*Assistant Examiner*—Evan Dzierzynski
(74) *Attorney, Agent, or Firm*—Innovation Counsel LLP

(57) ABSTRACT

A backlight assembly includes a light source, a light-guiding plate and a diffusion sheet that includes a first bead layer on a lower surface of the diffusion sheet facing the light-guiding plate, and a second bead layer on an upper surface of the diffusion sheet. To improve image display quality, the hardness of the beads of the first bead layer facing the light guide plate are equal to or less than that of the light guide plate to prevent scratching of the light guide plate.

31 Claims, 7 Drawing Sheets

BACKLIGHT ASSEMBLY AND LIQUID CRYSTAL DISPLAY DEVICE HAVING THE SAME

CROSS-REFERENCE TO RELATED APPLICATIONS

The present application claims priority from Korean Patent Application No. 2005-44154, filed on May 25, 2005, and Korean Patent Application No. 2005-50515, filed on Jun. 13, 2005, the disclosures of which are hereby incorporated herein by reference in their entireties.

BACKGROUND OF THE INVENTION

1. Field of the Invention

The present invention relates to a backlight assembly and a liquid crystal display (LCD) device having the backlight assembly and, more particularly, to a thinner backlight assembly having improved color reproducibility and image display quality.

2. Description of the Related Art

Image display devices, especially liquid crystal displays (LCDs), are desirable in many electronic devices such as mobile communication terminals, digital cameras, laptop computers, monitors, etc., because they can be thinner and have lower driving voltage and power consumption than either cathode ray tubes (CRTs) or plasma display panels (PDPs). The liquid crystals used in LCDs exhibit anisotropic refraction and anisotropic dielectric constant. Since the LCD neither generates nor emits light, it requires a backlight assembly to supply incident light. A conventional backlight assembly includes either a cold cathode fluorescent lamp (CCFL) or a light-emitting diode (LED) as a light source. The CCFL has low manufacturing costs, high luminance but is large in size and required a high driving voltage. Small-screen LCDs such as used in a mobile communication terminal require the use of LEDs, but these provide a point light source. A light-guide plate and a diffusion sheet are required in order to uniformly distribute light from a point light source onto a surface.

Materials that can be used for the light-guiding plate include polymethylmethacrylate (PMMA) and polycarbonate (PC). PMMA has good optical characteristics, high hardness and good plasticity, while PC has high heat resistance. In order to make thinner small-screen LCD device, the thickness of the light-guiding plate, which is the thickest element of the backlight assembly, has to be decreased. However, decreasing the thickness of the light-guiding plate decreases its heat resistance. In order to improve the heat resistance of the light-guiding plate, the light-guiding plate includes PC, which has high heat resistance.

The diffusion sheet that is employed with a light-guiding plate includes both a bead layer on its surface facing the light-guiding plate and a bead layer on its other surface to diffuse the light. These "lower" and "upper" bead layers are made of PMMA. The PMMA of the beads in the lower bead layer are harder than the PC used in the light-guiding plate. Abrasion between the beads of the diffusion sheet and the light guide plate can cause scratches that degrade the image display quality of the LCD device.

To generate white light, the backlight assembly employs a blue light LED having a yellow fluorescent material disposed on it. The blue light and a yellow light are combined to form a white light. However, in this arrangement the blue light predominates, thereby degrading the LCD's color reproducibility.

SUMMARY OF THE INVENTION

The present invention provides a backlight assembly that prevents scratching of the light-guiding plate and increases the intensity of longer wavelength light so as to improve color reproducibility. A backlight assembly in accordance with one aspect of the present invention includes a light source, a light-guiding plate and a diffusion sheet having a bead layer on each of its two surfaces. The beads of the diffusion plate layer facing the light guiding plate have a hardness that does not exceed that of the light-guiding plate and may be made of the same material as that of the light-guiding plate, e.g., a polycarbonate. The light-guiding plate may have a hardness comparable to that of a B pencil, and the beads of the diffusion plate may have a hardness no more than that of the B pencil and may include a nylon-based resin.

In accordance with another aspect of the present invention, the light source may include at least one light-emitting diode that generates a white light and the diffusion sheet may include a coating having a red fluorescent agent on its surface facing the light-guiding plate. Alternatively, the opposite surface of the diffusion sheet may also be coated with the red fluorescent agent. The red fluorescent agent may include a plurality of beads, each bead having a substantially spherical shape and should advantageously be no more than about 5 µm in diameter. The light-emitting diode may include a blue chip and a yellow fluorescent agent. The blue chip generates a bluish light. The yellow fluorescent agent changes a portion of the bluish light into a yellowish light so that the yellowish light is mixed with a remaining portion of the bluish light to generate the white light. The diameter of the beads in a first or upper layer of the diffusion sheet may range in size from about 5 µm to about 20 µm. The beads on a second layer coated on a lower surface of the diffusion sheet may be no more than about 5 µm in diameter.

BRIEF DESCRIPTION OF THE DRAWINGS

The above and other advantages of the present invention will become more apparent by describing in detail example embodiments thereof with reference to the accompanying drawings, in which.

DETAILED DESCRIPTION

Figure 1:
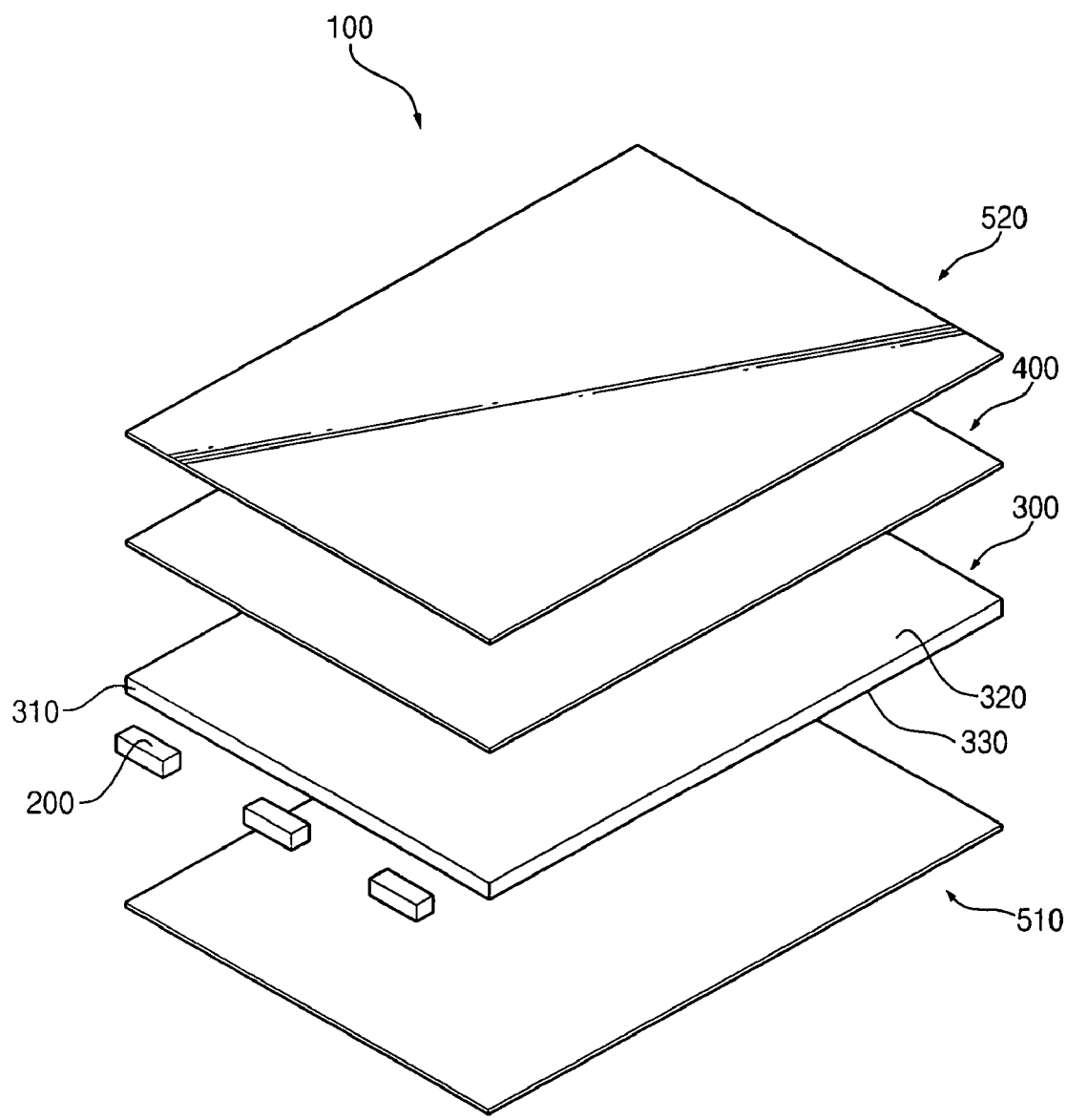
FIG. 1 is an exploded perspective view illustrating a backlight assembly in accordance with one embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items. It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly. The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in detail with reference to the accompanying drawings.

Figure 2:
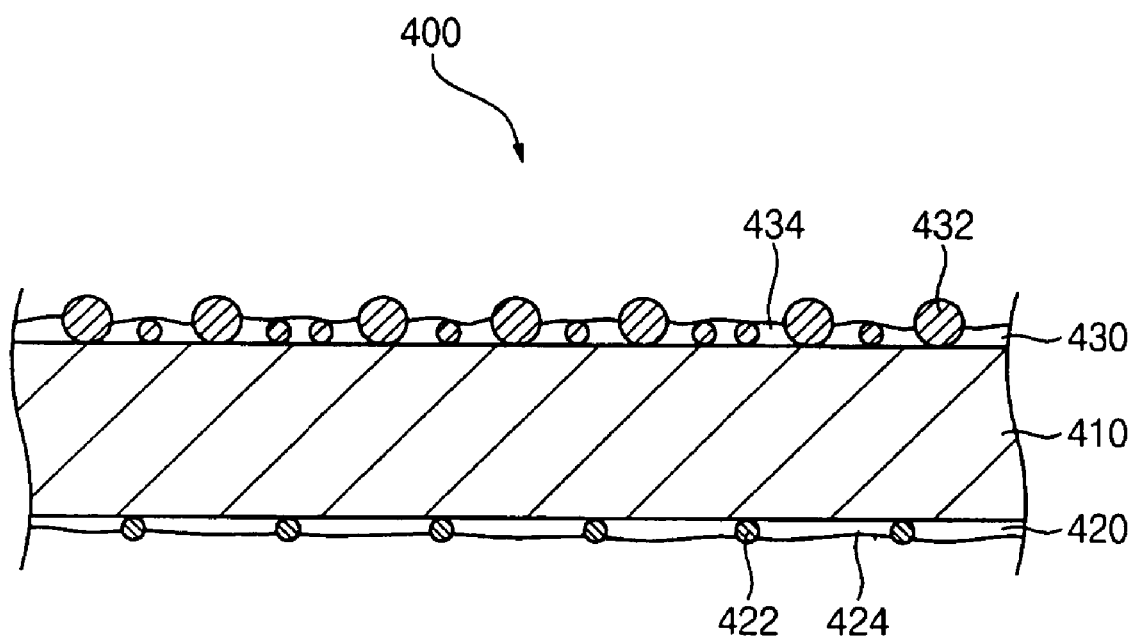
FIG. 2 is a cross-sectional view illustrating a diffusion sheet shown in FIG. 1.

FIG. 1 is an exploded perspective view illustrating a backlight assembly in accordance with one embodiment of the present invention. FIG. 2 is a cross-sectional view illustrating a diffusion sheet shown in FIG. 1.

Referring to FIGS. 1 and 2, the backlight assembly 100 includes a light source 200 for generating a light, a light-guiding plate 300 that guides the light generated from the light source 200, and a diffusion sheet 400 on a light-exiting surface 320 of the light-guiding plate 300. The light source 200 is adjacent to a light incident surface 310 of the light-guiding plate 300. In FIGS. 1 and 2, the light source 200 includes at least one light-emitting diode (LED). The light generated from the LED is concentrated within a predetermined angle range, so that a plurality of LEDs are on the light incident surface 310 of the light-guiding plate 300 to increase a luminance uniformity of the backlight assembly 100. The number and a light-emitting angle of the LEDs 200 may be changed based on a size of the light-guiding plate 300. Alternatively, the light source 200 may include a cold cathode fluorescent lamp (CCFL).

The light-guiding plate 300 guides the light generated from the light source 200 which may be a point light source or a linear light source is changed into a plane of light. The light-guiding plate 300 includes a transparent material to increase a luminance of the backlight assembly 100. The light-guiding plate 300 should be as thin as possible to decrease the thickness of the backlight assembly 100. The light-guiding plate 300 should have high heat resistance so that it will not be deformed by heat generated from the light source 200 and may be made of polycarbonate (PC) that has a higher heat resistance than polymethylmethacrylate (PMMA) which, in general, becomes deformed at a temperature of more than about 84° C. to about 100° C. The hardness of PMMA is substantially the same as that of a 3H pencil. Polycarbonate, in general, is deformed at a temperature of more than about 121° C. to about 142° C., and the hardness of PC is substantially the same as a B pencil. That is, PC has a higher heat resistance and a lower hardness than PMMA.

The light-guiding plate 300 includes the light incident surface 310 that faces the light source 200, the light-exiting surface 320 that is extended from a side of the light incident surface 310, and a light-reflecting surface 330 that is extended from another side of the light incident surface 310. The light-reflecting surface 330 faces the light-exiting surface 320. A reflecting pattern (not shown) may be formed on the light-reflecting surface 330 of the light-guiding plate 300 so that the light that is incident into the light-guiding plate 300 is scattered and reflected from the reflecting pattern (not shown). Examples of the reflecting pattern (not shown) include a printed pattern and an embossed pattern. The light that is incident into the light-guiding plate 300 is scattered and reflected from the reflecting pattern (not shown). That is, the light that is incident into the light-guiding plate 300 is modulated by the reflecting pattern (not shown), and a portion of the modulated light having an incident angle of more than a predetermined critical angle exits from the light-exiting surface 320 or the light-reflecting surface 330 of the light-guiding plate 300.

The diffusion sheet 400 is on the light-exiting surface 320 of the light-guiding plate 300. The diffusion sheet 400 diffuses the light-exiting the light-guiding plate 300 through the light-exiting surface 320 to increase the luminance when viewed on a plane and the luminance uniformity of the light. Referring FIG. 2, the diffusion sheet 400 includes a base film 410, a first bead layer 420 and a second bead layer 430. The first base film 410 includes a transparent material. The transparent material that can be used for the first base film 410 includes polyethylene terephthalate (PET). The first bead layer 420 is on a lower surface of the base film 410 facing the light-guiding plate 300. The first bead layer 420 is interposed between the base film 410 of the diffusion sheet 400 and the light-guiding plate 300 so that the diffusion sheet 400 is not attached to the light-guiding plate 300. That is, the diffusion sheet 400 is spaced apart from the light-guiding plate 300 by the first bead layer 420, and prevents a moiré effect, and thus the image display quality of an LCD device having the backlight assembly 100 may be improved. The first bead layer 420 includes a plurality of first beads 422, each bead having a substantially spherical shape, and a first coating layer 424 for fixing the first beads 422 to the base film 410. The first beads 422 are randomly distributed on the lower surface of the base film 410.

In FIGS. 1 and 2, a size of each of the first beads 422 may be no more than about 10 μm in diameter. The size of each of the first beads 422 may preferably be about 3 μm to about 7 μm in diameter. The first beads 422 have a lower hardness than that of the light-guiding plate 300, to prevent scratches of the light-guiding plate 300 by an abrasion between the first beads 422 and the light-guiding plate 300. Alternatively, the first beads 422 may have substantially the same hardness as that of the light-guiding plate 300. In FIGS. 1 and 2, the light-guiding plate 300 may be made of polycarbonate that has the hardness of that of the B pencil, and the first beads 422 have a hardness no more than that of the B pencil. For example, the first beads 422 include a nylon-based resin that has the hardness of the B pencil. Alternatively, the first beads 422 may have substantially the same material as that of the light-guiding plate 300. That is, the first beads 422 may be made of the PC used for the light-guiding plate 300. The first coating layer 424 fixes the first beads 422 to the base film 410. For example, the first coating layer 424 may include a thermosetting resin that is solidified by heat, or an ultraviolet light-curable resin that is solidified by an ultraviolet light.

Table 1 represents a relationship between a material of the first beads 422 and a depth of a scratch of the light-guiding plate 300.

TABLE 1

| Material | Depth of Scratch (μm) | White Point |
|---|---|---|
| Nylon | 0.05 | X |
| PMMA coated with rubber | 2.14 | O |
| PMMA without coating | 3.37 | O |

Referring to Table 1, the first beads 422 including the nylon-based resin beads, PMMA beads coated with a rubber material and PMMA beads without a coating were tested in forming the scratches. The beads 422 when made of the nylon-based resin beads formed a scratch having a smaller depth than that made by the PMMA beads coated with the rubber material or the PMMA beads without a coating. When the scratched light-guiding plate 200 was tested by a light that passed through the scratch, a white point was not formed on the light-guiding plate 200 that was scratched by the first beads 422 that included the nylon-based resin.

When the first beads 422 that are on the lower surface of the diffusion sheet 400 have a hardness no more than that of the light-guiding plate 300, fewer scratches are formed on the light-guiding plate 300 and fewer "white points" are formed, thereby improving the image display quality of the LCD device.

A second bead layer 430 is formed on an upper surface of the base film 410. The second bead layer 430 diffuses the light that passes through the diffusion sheet 400, and increases a luminance of the backlight assembly 100 when viewed on a plane. The second bead layer 430 includes a plurality of second beads 432, each bead having a substantially spherical shape and a second coating layer 434 for fixing the second beads 432 to the base film 410. The second beads 432 are randomly distributed on the upper surface of the base film 410. A size of each of the second beads 432 may be about 5 μm to about 20 μm in diameter. The second beads 432 have a greater density than that of the first beads 422.

The second beads 432 may be made of PMMA. Alternatively, the second beads 432 may include the nylon-based resin or PC. That is, the second beads 432 may be made of substantially the same material as the first beads 422. The second coating layer 434 fixes the second beads 432 to the base film 410. For example, the second coating layer 434 may include a thermosetting resin that is solidified by heat, or an ultraviolet light-curable resin that is solidified by an ultraviolet light.

The backlight assembly 100 may further include a reflection sheet 510 on the light-reflecting surface 330 of the light-guiding plate 300, and a brightness enhancement film 520 on the upper surface of the diffusion sheet 400. The light that leaks from the light-reflecting surface 330 of the light-guiding plate 300 is reflected from the reflection sheet 510 toward the light-guiding plate 300 to increase the luminance of the backlight assembly 100. The reflection sheet 510 includes a highly reflective material. Examples of the highly reflective material that can be used for the reflection sheet 510 include polyethylene terephthalate (PET) or polycarbonate (PC). The brightness enhancement film 520 guides the light that has passed through the diffusion sheet to improve luminance characteristics of the light. The brightness enhancement film 520 may include at least one prism sheet to increase a luminance when viewed on a plane. In addition, the brightness enhancement film 520 may further include a reflective polarizing film to increase the luminance of the backlight assembly 100.

Figure 3:
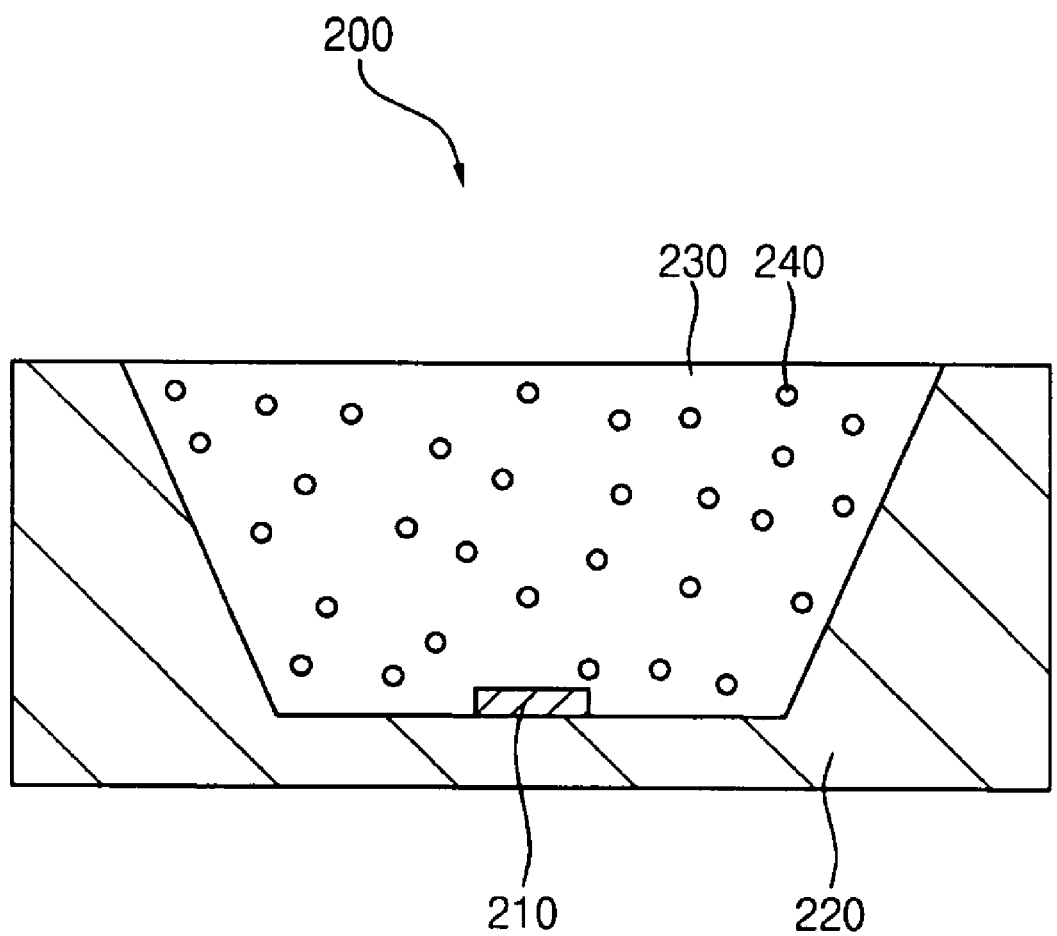
FIG. 3 is a cross-sectional view illustrating a light-emitting diode (LED) shown in FIG. 1.

FIG. 3 is a cross-sectional view illustrating a light-emitting diode (LED) shown in FIG. 1. LED 200 includes a light-emitting element 210 such as a blue-light LED housed in a case 220 and held in by molding member 230. Case 220 has a cone shape so that the light exits from the case 220 in a wide angle range. The case 220 may be made of an insulating material such as a polymer or a ceramic to protect the light-emitting element 210. A reflecting layer (not shown) may be formed on an inner surface of the case 220 so that the light is reflected from the reflecting layer (not shown). The molding member is a transparent resin 230 such as silicone resin, polyurethane, etc, that is filled in case 220 to protect the light-emitting element 210.

The molding member 230 may include a fluorescent agent 240 that changes the light generated from the light-emitting element 210 into a white light. For example, when the light-emitting element 210 is a blue light emitting LED, the fluorescent agent 240 includes a yellow fluorescent agent such as Yttrium Aluminum Garnet (YAG) to change a portion of the bluish light into a yellow light that mixes with the remaining portion of the bluish light to generate white light.

Figure 4:
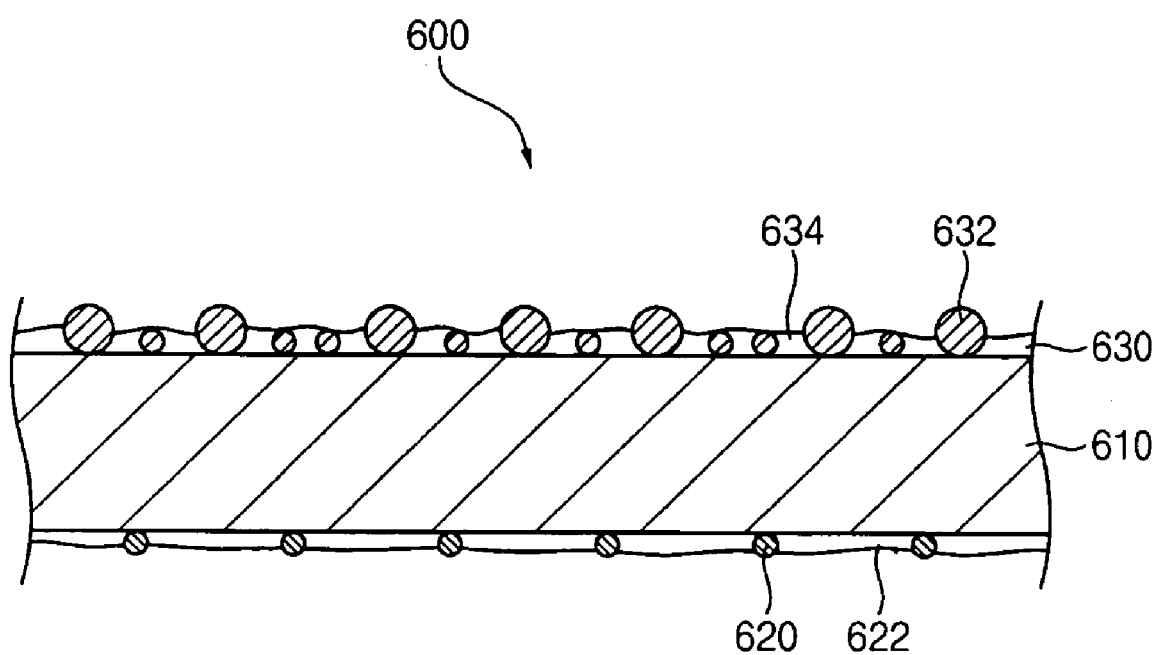
FIG. 4 is a cross-sectional view illustrating a diffusion sheet in accordance with another embodiment of the present invention.

FIG. 4 is a cross-sectional view illustrating a diffusion sheet in accordance with another embodiment of the present invention. Diffusion sheet 600 is on a light-exiting surface 320 of a light-guiding plate 300. The diffusion sheet 600 includes a base film 610 and a red fluorescent agent 620 that is coated on the base film 610. The base film 610 includes a transparent material. For example, the base film 610 includes polyethylene terephthalate (PET). A red fluorescent agent 620 is coated on a lower surface of the base film 610, and faces the light-guiding plate 300. The red fluorescent agent 620 is fixed to the lower surface of the base film 610 by a first coating layer 622. For example, the first coating layer 622 includes a thermosetting resin that is solidified by heat or an ultraviolet curable resin that is solidified by an ultraviolet light.

The red fluorescent agent 620 may include a plurality of beads, each bead having a substantially spherical shape. In FIG. 4, a plurality of red fluorescent agents 620 are randomly scattered on the base film 610. A size of each of the red fluorescent agent 620 beads may be no more than 5 μm in diameter. When the diffusion sheet 600 includes the red fluorescent agent 620, an amount of a bluish light may be decreased, and an amount of a reddish light may be increased so that a spectrum range of the light generated from a backlight assembly 100 may be changed.

Figure 5:
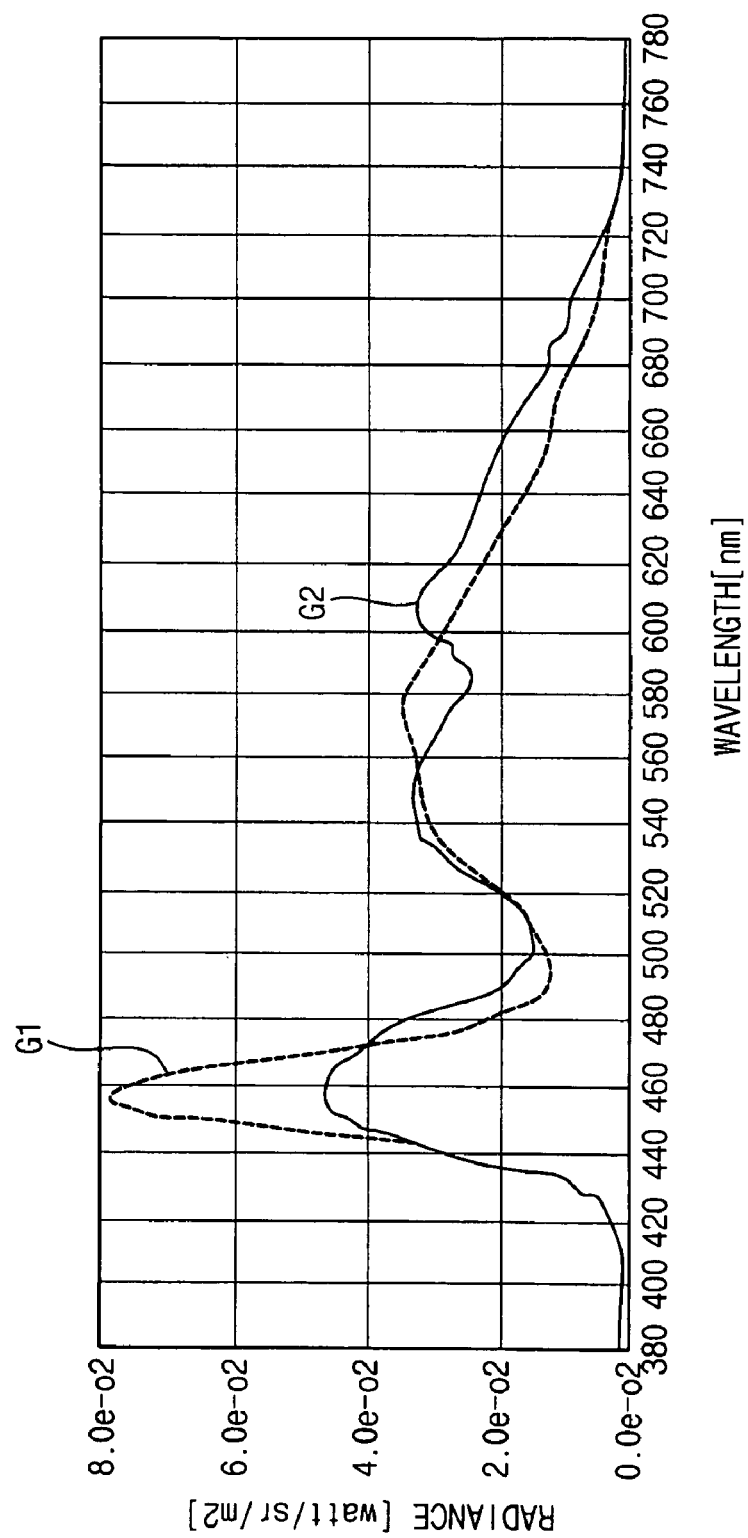
FIG. 5 is a graph illustrating a relationship between a wavelength and a luminance of a radiation.

FIG. 5 is a graph illustrating a relationship between a wavelength and a luminance of a radiation. The luminance of the radiation represents a radiance of the light. A first graph line G1 represents a spectrum of a backlight assembly without the red fluorescent agent 620, and a second graph line G2 represents a spectrum of a backlight assembly having the diffusion sheet 600 of FIG. 4.

Referring to FIGS. 1, 4 and 5, in the first graph line G1, when the backlight assembly does not include the red fluorescent agent 620 and only includes the blue chip and the yellow fluorescent material, an amount of the bluish light is greater than that of the yellowish light, and the amount of the yellowish light is greater than that of the reddish light. However, in the second graph line G2, when the backlight assembly includes the diffusion sheet 600 that has the red fluorescent agent 620, the amount of the bluish light may be decreased, and that of the reddish light is increased so that the amounts of the bluish, yellowish and reddish lights are substantially the same. The backlight assembly may also further include the yellow fluorescent agent. Accordingly, color reproducibility of the liquid crystal display device having the diffusion sheet 600 including the red fluorescent agent 620 is improved. In addition, the diffusion sheet 600 may not be attached to the light-guiding plate 300 although a thickness of the light-guiding plate 300 may be decreased. That is, the diffusion sheet 600 is spaced apart from the light-guiding plate 300 by the red fluorescent agent 620 to prevent a moiré effect of the LCD device, and thus the image display quality of the LCD device may be improved.

A first bead layer 630 may be formed on an upper surface of the diffusion sheet 600. The first bead layer 630 diffuses the light that passes through the diffusion sheet 600, and increases a luminance of the backlight assembly 100 when viewed on a plane. The first bead layer 630 includes a plurality of first beads 632 and a first coating layer 634. The first beads 632 are randomly distributed on a base film 610 of the diffusion sheet 600. A size of each of the first beads 632 may be about 5 μm to about 20 μm in diameter. The first beads 632 may include a nylon-based resin, PMMA, etc. The first beads 632 are fixed to an upper surface of the base film 610 through the first coating layer 634. For example, the first coating layer 634 may include a thermosetting resin that is solidified by heat, or an ultraviolet light-curable resin that is solidified by an ultraviolet light.

Figure 6:
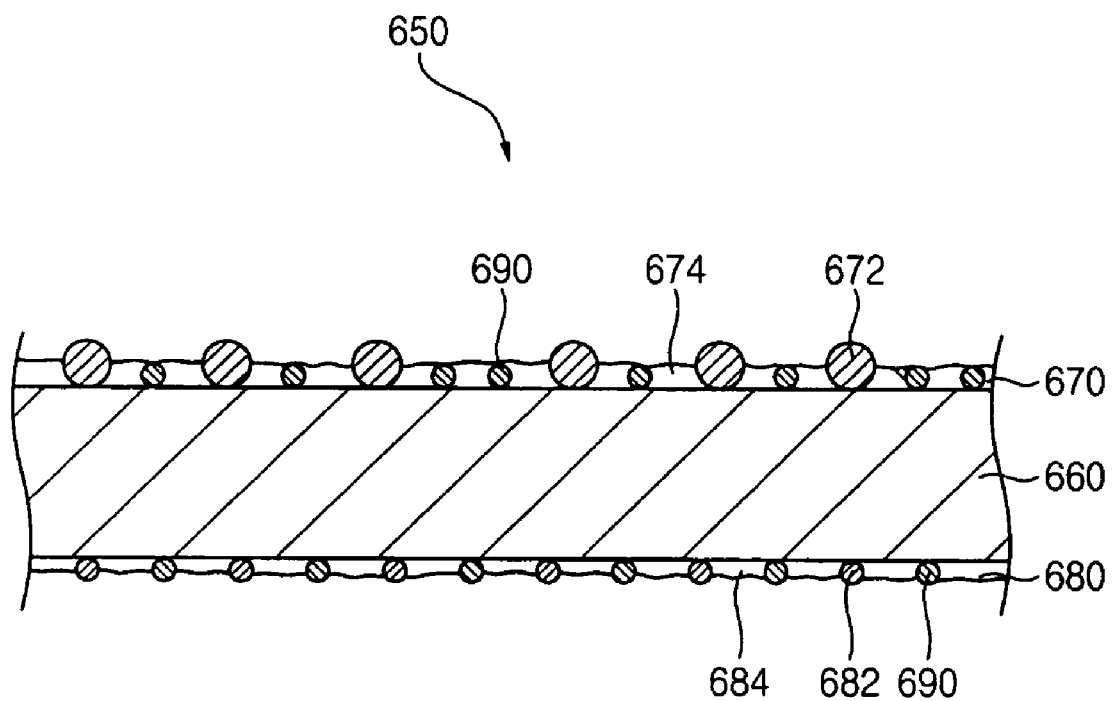
FIG. 6 is a cross-sectional view illustrating a diffusion sheet in accordance with another embodiment of the present invention.

FIG. 6 is a cross-sectional view illustrating a diffusion sheet in accordance with another embodiment of the present invention. Diffusion sheet 650 includes a base film 660 and a red fluorescent agent 690 that is coated on the base film 660. The base film 660 includes a transparent material. Examples of the transparent material that can be used for the base film 660 include polyethylene terephthalate (PET), PMMA, etc. In FIG. 6, the base film 660 includes PET. The red fluorescent agent 690 is coated on a lower surface and an upper surface of the base film 660. The red fluorescent agent 690 may include a plurality of beads, each bead having a substantially spherical shape. The diffusion sheet 650 may include a plurality of the red fluorescent agent 690 beads that are randomly distributed on the lower and upper surfaces of the base film 660. For example, a size of each of the red fluorescent agent 690 beads may be no more than about 5 μm in diameter. When the diffusion sheet 650 includes the red fluorescent agent 690, an amount of a bluish light may be decreased and an amount of a reddish light may be increased so that a spectrum range of the light generated from a backlight assembly 100 may be changed.

A first bead layer 670 may be formed on an upper surface of the diffusion sheet 650. The first bead layer 670 diffuses the light that passes through the diffusion sheet 650, and increases a luminance of the backlight assembly 100 when viewed on a plane. The first bead layer 670 includes a plurality of first beads 672 and a first coating layer 674. The first beads 672 are randomly distributed on the upper surface of the base film 660. A size of each of the first beads 672 may be about 5 μm to about 20 μm in diameter. The first beads 672 may include a nylon-based resin or PMMA. The first beads 672 are fixed to the upper surface of the base film 660 through the first coating layer 674. For example, the first coating layer 674 may include a thermosetting resin that is solidified by heat, or an ultraviolet light-curable resin that is solidified by an ultraviolet light. A second bead layer 680 may be formed on a lower surface of the diffusion sheet 650 so that the diffusion sheet 650 is not attached to the light-guiding plate 300. The second bead layer 680 includes a plurality of second beads 682 and a second coating layer 684. The second beads 682 are randomly distributed on the lower surface of the base film 660. A size of each of the second beads 682 may be no more than about 5 μm in diameter. The second beads 682 may include a nylon-based resin. The second beads 682 are fixed to the lower surface of the base film 660 through the second coating layer 684. For example, the second coating layer 684 may include a thermosetting resin that is solidified by heat, or an ultraviolet light-curable resin that is solidified by an ultraviolet light. Alternatively, the red fluorescent agent 690 may be formed only on the upper surface of the base film 660.

Figure 7:
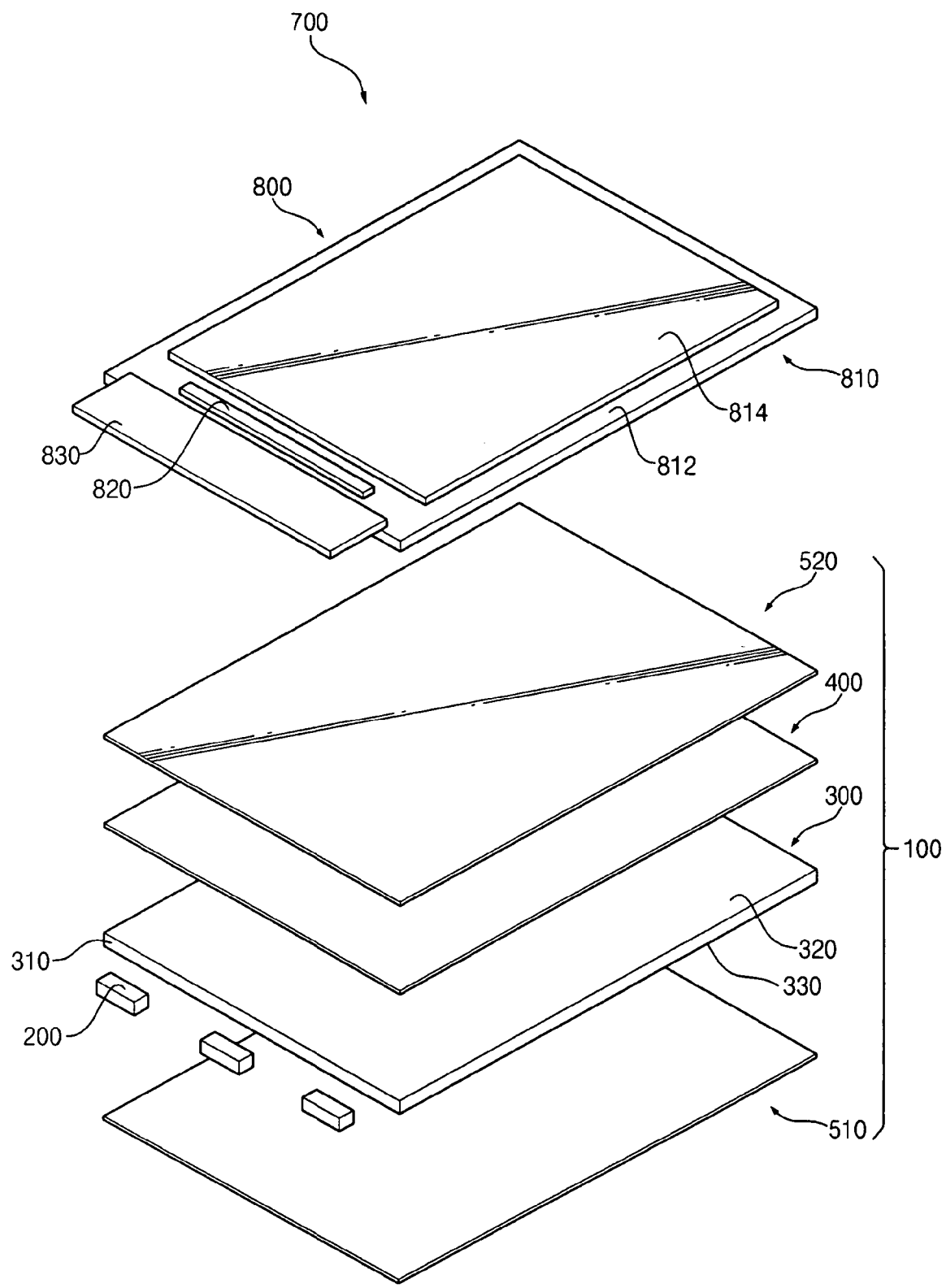
FIG. 7 is an exploded perspective view illustrating a liquid crystal display (LCD) device in accordance with one embodiment of the present invention.

FIG. 7 is an exploded perspective view illustrating a liquid crystal display (LCD) device in accordance with one embodiment of the present invention. LCD device 700 includes a backlight assembly 100 and a display unit 800. The backlight assembly 700 supplies the display unit 800 with a light. The display unit 800 displays an image based on the light generated from the backlight assembly 100. The backlight assembly of FIG. 7 is substantially the same as in FIGS. 1 to 6. Thus, the same reference numerals will be used to refer to the same or like parts as those described in FIGS. 1 to 6 and any further explanation concerning the above elements will be omitted. The display unit 800 includes an LCD panel 810, a driving chip 820 and a flexible circuit board 830. The LCD panel 810 displays the image based on the light generated from the backlight assembly 100. The driving chip 820 generates driving signals to drive the LCD panel 810. The flexible circuit board 830 applies control signals to the LCD panel 810. The LCD panel 810 includes a first substrate 812, a second substrate 814 and a liquid crystal layer (not shown). The second substrate 814 faces the first substrate 812. The liquid crystal layer (not shown) is interposed between the first and second substrates 812 and 814.

The first substrate 812 includes a plurality of thin film transistors (TFT) that are arranged in a matrix shape. For example, the first substrate 812 includes a transparent glass. A source electrode and a gate electrode of each of the TFTs are electrically connected to a data line and a gate line, respectively. A drain electrode of each of the TFTs is electrically connected to a pixel electrode that has a transparent conductive material. The second substrate 814 is a color filter substrate that has red, green and blue pixels. For example, the second substrate 814 includes a transparent glass. The second substrate 814 may further include a common electrode that has a transparent conductive material. When the electric power is applied to the gate electrode of the TFT, the TFT is turned on so that an electric field is formed between the pixel electrode (not shown) and the common electrode (not shown). Liquid crystals in the liquid crystal layer (not shown) that are interposed between the first and second substrates 812 and 814 vary arrangement in response to the electric field applied thereto, and thus a light transmittance thereof may be changed to display an image. The driving chip 820 is formed on the first substrate 812. The driving chip 820 generates the driving signals based on the control signals that are from the flexible circuit board 830 to drive the LCD panel 810. The driving signals generated from the driving chip 820 are applied to the gate and data lines of the first substrate 812 to drive the LCD panel 810. The flexible circuit board 830 is electrically connected to an end portion of the first substrate 812 on which the driving chip 820 is mounted. The flexible circuit board 830 includes a timing controller, a memory, etc. The timing controller generates a timing controlling signal to control an application of the driving signals. A data signal is stored in the memory. For example, the flexible circuit board 830 may be electrically connected to the first substrate 812 through an anisotropic conductive film (ACF).

According to the present invention, the beads formed on the lower surface of the diffusion sheet have a hardness less than or equal to that of the diffusion plate so that scratches between the diffusion sheet and the light-guiding plate are prevented, to improve the image display quality of the LCD device. In addition, the diffusion sheet includes the red fluorescent agent so that the amount of the bluish light may be decreased and the amount of the reddish light may be increased. Therefore, the color reproducibility of the LCD device may be improved although the luminance of the LCD device is not decreased.

This invention has been described with reference to the example embodiments. It is evident, however, that many alternative modifications and variations will be apparent to those having skill in the art in light of the foregoing description. Accordingly, the present invention embraces all such alternative modifications and variations as falling within the spirit and scope of the appended claims.

What is claimed is:

1. A backlight assembly comprising:
a light source generating a light;
a light-guiding plate that guides the light generated from the light source; and
a diffusion sheet on a light-exiting surface of the light-guiding plate, the diffusion sheet including:
a first bead layer on a lower surface of the diffusion sheet facing the light-guiding plate, the first bead layer including a plurality of first beads that have a hardness no more than that of the light-guiding plate; and
a second bead layer on an upper surface of the diffusion sheet.

2. The backlight assembly of claim 1, wherein the first beads comprise substantially the same material as the light-guiding plate.

3. The backlight assembly of claim 1, wherein the light-guiding plate comprises polycarbonate.

4. The backlight assembly of claim 3, wherein the light-guiding plate has a hardness substantially equal to that of a B pencil.

5. The backlight assembly of claim 4, wherein the first beads have a hardness no more than that of a B pencil.

6. The backlight assembly of claim 3, wherein the first beads comprise a nylon-based resin.

7. The backlight assembly of claim 3, wherein the first beads comprise the polycarbonate.

8. The backlight assembly of claim 1, wherein a size of each of the first beads is no more than about 10 μm in diameter.

9. The backlight assembly of claim 1, further comprising a first coating layer to fix the first beads to the diffusion sheet.

10. The backlight assembly of claim 1, wherein the second bead layer comprises:
a plurality of second beads; and
a second coating layer to fix the second beads to the diffusion sheet.

11. The backlight assembly of claim 10, wherein the second beads comprise polymethylmethacrylate.

12. The backlight assembly of claim 10, wherein the second beads comprise a nylon-based resin.

13. The backlight assembly of claim 10, wherein a size of each of the second beads is about 5 μm to about 20 μm in diameter.

14. The backlight assembly of claim 1, wherein the light source comprises at least one light-emitting diode that generates a white light.

15. The backlight assembly of claim 1, further comprising:
a reflection sheet on a light-reflecting surface of the light-guiding plate; and
a brightness enhancement film on the diffusion sheet.

16. A backlight assembly comprising:
at least one light-emitting diode that generates a white light;
a light-guiding plate that guides the white light generated from the light-emitting diode; and
a diffusion sheet on a light-exiting surface of the light-guiding plate, a red fluorescent agent being coated on a lower surface of the diffusion sheet facing the light-guiding plate,
wherein the diffusion sheet further comprises a second bead layer that is coated on the lower surface of the diffusion sheet, and the second bead layer includes a plurality of second beads.

17. The backlight assembly of claim 16, wherein the red fluorescent agent is coated on a lower surface and an upper surface of the diffusion sheet.

18. The backlight assembly of claim 16, wherein the red fluorescent agent comprises a plurality of beads, each bead having a substantially spherical shape.

19. The backlight assembly of claim 18, wherein a size of each of the red fluorescent agent beads is no more than about 5 µm in diameter.

20. The backlight assembly of claim 16, wherein the light-emitting diode comprises:
   a blue chip that generates a bluish light; and
   a yellow fluorescent agent to change a portion of the bluish light into a yellowish light so that the yellowish light is mixed with a remaining portion of the bluish light to generate the white light.

21. The backlight assembly of claim 16, wherein the diffusion sheet further comprises a first bead layer that is coated on an upper surface of the diffusion sheet.

22. The backlight assembly of claim 21, wherein the first bead layer comprises a plurality of first beads, and a size of each of the first beads is about 5 µm to about 20 µm in diameter.

23. The backlight assembly of claim 21, wherein a size of each of the second beads is no more than about 5 µm in diameter.

24. The backlight assembly of claim 6, further comprising:
   a reflection sheet on a reflecting surface of the light-guiding plate; and
   a brightness enhancement film on an upper surface of the diffusion sheet.

25. A liquid crystal display device comprising:
   a backlight assembly including:
   a light source generating a light;
   a light-guiding plate that guides the light generated from the light source; and
   a diffusion sheet on a light-exiting surface of the light-guiding plate, the diffusion sheet including:
   a first bead layer on a lower surface of the diffusion sheet facing the light-guiding plate, the first bead layer including
   a plurality of first beads that have a hardness no more than that of the light-guiding plate; and
   a second bead layer on an upper surface of the diffusion sheet; and
   a liquid crystal display panel that displays an image based on the light generated from the backlight assembly.

26. The liquid crystal display device of claim 25, wherein the light-guiding plate comprises polycarbonate that has substantially the same hardness as a B pencil.

27. The liquid crystal display device of claim 26, wherein the first beads have a hardness no more than that of a B pencil.

28. The liquid crystal display device of claim 26, wherein the first beads comprise a nylon-based resin.

29. A liquid crystal display device comprising:
   a backlight assembly generating a light, the backlight assembly including:
   at least one light-emitting diode that generates a white light;
   a light-guiding plate that guides the white light generated from the light-emitting diode; and
   a diffusion sheet on a light-exiting surface of the light-guiding plate, a red fluorescent agent being coated on a lower surface of the diffusion sheet facing the light-guiding plate; and
   a liquid crystal display panel that displays an image based on the light generated from the backlight assembly,
   wherein the red fluorescent agent comprises a plurality of beads on the lower surface of the diffusion sheet.

30. The liquid crystal display device of claim 29, wherein the red fluorescent agent is coated on an upper surface of the diffusion sheet.

31. The liquid crystal display device of claim 29, wherein each of the beads has a substantially spherical shape, and a size of each of the beads is no more than about 5 µm in diameter.

* * * * *